Patented May 6, 1941

2,240,514

UNITED STATES PATENT OFFICE 2,240,514

PROCESS FOR PREPARING CYCLOPROPANE

John M. Ort, Rockville Centre, N. Y., assignor to E. R. Squibb & Sons, New York, N. Y., a corporation of New York No Drawing. Application June 23, 1939, Serial No. 280,849

4 Claims. (Cl. 260—666)

This invention relates to, and has for its object the vision of, a simple and efficient process for the production of cyclopropane from trimethylene dibromide.

Cyclopropane has been prepared from trimethylene dibromide heretofore by reaction with a metal reduction agent in an essentially-alcoholic reaction medium, e. g., by reaction with zinc in about 86% ethanol (Lott and Christiansen, Jour. A. Ph. A., 19 (1930) 341). In using this process for the commercial production of cyclopropane, it is obviously essential for economic reasons that the alcohol used in the reaction medium be recovered; such recovery is time-consuming and requires additional apparatus, and hence is relatively expensive, but was considered unavoidable owing to the known substantial water-insolubility of trimethylene dibromide and consequent presumed necessity for an organic solvent such as ethanol.

Surprisingly, however, it has been found that trimethylene dibromide may be economically converted to cyclopropane by treatment with a metal reduction agent in an essentially-aqueous reaction medium (i. e. a medium constituted in major proportion, or entirely, of water).

Preferably, the reaction is effected in the presence of a small proportion of an alkali, notably $Mg(OH)_2$, as described and claimed in my copending application Serial No. 280,847 filed simultaneously herewith. The metal reduction agents utilizable in the practice of this invention include, inter alia, zinc and magnesium, and the reaction medium may include a minor proportion of a lower aliphatic alcohol, e. g. methyl, ethyl or isopropyl alcohol. The reaction is advantageously effected in the presence of catalyst consisting of a dissolved salt of a metal capable of being displaced by the metal reduction agent (as described and claimed in the copending application of W. A. Lott, Serial No. 139,987, filed April 30, 1937, now Patent No. 2,211,787.)

The following examples are illustrative of the invention:

Example 1

A mixture of the following:

| | | |
|---|---|---|
| Zinc dust | grams | 60 |
| Distilled water | cubic centimeters | 200 |
| NaBr | grams | 2.4 | is heated on a steam bath (at about 95–110° C.) and 128.2 g. trimethylene dibromide is added slowly so as to produce the desired rate of evolution of cyclopropane; an about 95% yield is obtained, the evolved gases containing about 6% of hydrogen.

Example 2

A mixture of the following:

| | | |
|---|---|---|
| Zinc dust | grams | 60 |
| Distilled water | cubic centimeters | 200 |
| NaBr | grams | 2.4 |
| Dry $Mg(OH)_2$ | do | 8 | is heated on a steam bath and 128.2 g. trimethylene dibromide is added slowly so as to produce the desired rate of evolution of cyclopropane; an about 95% yield of cyclopropane is obtained, the evolved gases containing a little over 5% hydrogen.

Example 3

A mixture of the following:

| | | |
|---|---|---|
| 95% ethanol | cubic centimeters | 80 |
| Water | do | 240 |
| 5% $FeCl_3$ solution | do | 6.4 |
| 5% $CuSO_4$ solution | do | 6.4 |
| KBr | grams | 2.4 |
| Powdered zinc | do | 52 |
| $Mg(OH)_2$ | do | 56 | is heated to about 80–90° C., and 128.8 g. trimethylene dibromide added slowly so as to produce the desired rate of evolution of cyclopropane; an about 97% yield is obtained, the evolved gases containing about 1.5% hydrogen.

This invention may be variously otherwise embodied within the scope of the appended claims.

I claim:

1. The process of preparing cyclopropane which comprises reacting trimethylene dibromide with a metal reduction agent in an essentially-aqueous reaction medium containing a small proportion of an alkali.

2. The process of preparing cyclopropane which comprises reacting trimethylene dibromide with zinc in an essentially-aqueous reaction medium containing a small proportion of an alkali.

3. The process of preparing cyclopropane which comprises reacting trimethylene dibromide with zinc in a reaction medium consisting entirely of water and containing a small proportion of an alkali.

4. The process of preparing cyclopropane which comprises reacting trimethylene dibromide with zinc in a reaction medium consisting entirely of water and containing a small proportion of $Mg(OH)_2$.

JOHN M. ORT.